(12) United States Patent
Shulman et al.

(10) Patent No.: US 8,713,682 B2
(45) Date of Patent: *Apr. 29, 2014

(54) DYNAMIC LEARNING METHOD AND ADAPTIVE NORMAL BEHAVIOR PROFILE (NBP) ARCHITECTURE FOR PROVIDING FAST PROTECTION OF ENTERPRISE APPLICATIONS

(75) Inventors: Amichai Shulman, Tel-Aviv (IL); Michael Boodaei, Givataim (IL); Shlomo Kramer, Tel-Aviv (IL)

(73) Assignee: Imperva, Inc., Redwood Shores, CA (US)

( * ) Notice: Subject to any disclaimer, the term of this patent is extended or adjusted under 35 U.S.C. 154(b) by 299 days.

This patent is subject to a terminal disclaimer.

(21) Appl. No.: 12/814,753

(22) Filed: Jun. 14, 2010

(65) Prior Publication Data
US 2010/0251377 A1 Sep. 30, 2010

Related U.S. Application Data

(63) Continuation of application No. 10/991,467, filed on Nov. 19, 2004, now Pat. No. 7,743,420.

(60) Provisional application No. 60/526,098, filed on Dec. 2, 2003.

(51) Int. Cl.
*G06F 11/00* (2006.01)
*G06F 21/57* (2013.01)
*H04L 29/06* (2006.01)

(52) U.S. Cl.
CPC .......... *G06F 21/577* (2013.01); *H04L 63/1433* (2013.01)
USPC ...................................... 726/25; 726/1; 726/2

(58) Field of Classification Search
CPC . G06F 21/577; G06F 21/6218; G06F 21/604; G06F 17/30306; H04L 63/20; H04L 63/102; H04L 63/0227; H04L 63/1408; H04L 63/1433; H04L 63/1416; H04L 12/2602; H04L 41/16; H04L 41/142; H04L 43/00; H04L 43/106
USPC .................................................. 726/25, 1, 2
See application file for complete search history.

(56) References Cited

U.S. PATENT DOCUMENTS

| 6,243,756 | B1 | 6/2001 | Whitmire et al. |
| 6,249,755 | B1 | 6/2001 | Yemini et al. |
| 6,275,939 | B1 | 8/2001 | Garrison |
| 6,279,113 | B1 | 8/2001 | Vaidya |
| 6,321,338 | B1 * | 11/2001 | Porras et al. ............ 726/25 |

(Continued)

OTHER PUBLICATIONS

Ye et al., "Probabilistic Networks with Undirected Links for Anomaly Detection", 2000, IEEE.*

(Continued)

*Primary Examiner* — Yogesh Paliwal
(74) *Attorney, Agent, or Firm* — Blakely Sokoloff Taylor & Zafman, LLP

(57) ABSTRACT

An adaptive normal behavior profile (NBP) architecture for providing fast protection of enterprise applications are disclosed. The adaptive NBP architecture includes a plurality of profile items. Each profile item includes a plurality of profile properties holding the descriptive values of the respective item. An application-level security system can identify and prevent attacks targeted at enterprise applications by matching application events against at least a single profile item in the adaptive NBP.

272 Claims, 6 Drawing Sheets

(56) References Cited

U.S. PATENT DOCUMENTS

| | | | |
|---|---|---|---|
| 6,363,489 B1 | 3/2002 | Comay et al. | |
| 6,405,219 B2 | 6/2002 | Saether et al. | |
| 6,405,318 B1 | 6/2002 | Rowland | |
| 6,460,141 B1 | 10/2002 | Olden | |
| 6,477,651 B1 | 11/2002 | Teal | |
| 6,487,666 B1 | 11/2002 | Shanklin et al. | |
| 6,513,122 B1 | 1/2003 | Magdych et al. | |
| 6,584,569 B2 | 6/2003 | Reshef et al. | |
| 6,609,205 B1* | 8/2003 | Bernhard et al. | 726/22 |
| 7,181,768 B1* | 2/2007 | Ghosh et al. | 726/23 |
| 7,472,413 B1* | 12/2008 | Mowshowitz | 726/10 |
| 7,743,420 B2 | 6/2010 | Shulman et al. | |
| 7,752,662 B2 | 7/2010 | Shulman et al. | |
| 2002/0026446 A1 | 2/2002 | Groos, III et al. | |
| 2003/0023873 A1 | 1/2003 | Ben-Itzhak | |
| 2003/0154399 A1* | 8/2003 | Zuk et al. | 713/201 |
| 2003/0204719 A1* | 10/2003 | Ben-Itzhak | 713/152 |
| 2005/0172162 A1 | 8/2005 | Takahashi et al. | |

OTHER PUBLICATIONS

Millet et al., Cookies and Web Browser Design: Toward Realizing Informed Consent Online, 2001, ACM, pp. 46-52.

Konopnicki et al., W3QS: A Query System for the World-Wide Web, 1995, Proceedings of the 21$^{st}$ VLDB Conference, pp. 54-65.

Ye et al., Probablistic Networks with Undirected Links for Anomaly Detection, 2000, IEEE.

Non-Final Office Action, U.S. Appl. No. 10/991,467, dated Dec. 31, 2007, 20 pages.

Restriction Requirement, U.S. Appl. No. 10/991,467, dated Jul. 10, 2008, 7 pages.

Non-Final Office Action, U.S. Appl. No. 10/991,467, dated Oct. 28, 2008, 15 pages.

Final Office Action, U.S. Appl. No. 10/991,467, dated Sep. 1, 2009, 15 pages.

Notice of Allowance, U.S. Appl. No. 10/991,467, dated Apr. 6, 2010, 11 pages.

*F5 Networks, Inc. vs. Imperva, Inc.*, United States District Court for the Western District of Washington (Seattle), Civil Docket for Case #: 2:10-cv-00760-RSM, 8 pages, downloaded from https://ecf.wawd.uscourts.gov/cgi-bin/DktRpt.pl?61044723264 . . . on Jan. 24, 2011.

*F5 Networks, Inc. vs. Imperva, Inc.*, "Amended Complaint for Patent Infringement", filed Jul. 15, 2010, 17 pages, Case No. 2:10-cv-00760-RSM, Document 15.

*F5 Networks, Inc. vs. Imperva, Inc.*, "Imperva, Inc.'s Answer and Counterclaims to F5's Amended Complaint for Patent Infringement", filed Jul. 15, 2010, 9 pages, Case No. 2:10-cv-00760-RSM, Document 17.

*F5 Networks, Inc. vs. Imperva, Inc.*, "F5 Networks, Inc.'s Answer, Affirmative Defenses and Counterclaims to Imperva, Inc.'s Counterclaims", filed Aug. 9, 2010, 7 pages, Case No. 2:10-cv-00760-RSM, Document 19.

*F5 Networks, Inc. vs. Imperva, Inc.*, "Imperva, Inc.'s Answer to F5 Networks, Inc.'s Counterclaims", filed Sep. 2, 2010, 4 pages, Case No. 2:10-cv-00760-RSM, Document 21.

*F5 Networks, Inc. vs. Imperva, Inc.*, "Stipulated Motion and Order to Extend Infringement, Noninfringement, and Invalidity, Deadlines, and Deadline for Proposing Claim Terms to Construe", filed Oct. 26, 2010, 4 pages, Case No. 2:10-cv-00760-RSM, Document 27.

*F5 Networks, Inc. vs. Imperva, Inc.*, "Stipulated Motion and Order to Continue Suspension of Case Schedule for 45 Days for Settlement Discussions", filed Dec. 28, 2010, 4 pages, Case No. 2:10-cv-00760-RSM, Document 31.

*F5 Networks, Inc. vs. Imperva, Inc.*, "Stipulated Motion and Order of Dismissal", filed Mar. 7, 2011, 2 pages, Case No. 2:10-cv-00760-RSM, Document 33.

"Check Point Software Co-Founder Starts New Security Company WebCohort, Raises First Round From Accel Partners", Internet Wire, May 27, 2002, 1 page, WebCohort, Inc.

"Imperva, SecureSphere, Technical Description", 2004, 20 pages, Imperva, Inc.

"Imperva Unveils Next Generation Firewall Technology: Dynamic Profiling", Aug. 23, 2004, 2 pages, Imperva, Inc.

"New product foils hackers who slip through firewalls", Feb. 3, 2003, 2 pages, WebCohort Inc.

"SecureSphere 1.2, Introducing WebCohort SecureSphere1.2", 2002, 1 page, WebCohort Inc.

"SecureSphere Dynamic Profiling Firewall, Total Application Security," 2004, 2 pages, Imperva, Inc.

SecureSphere Management and Reporting, Sep. 26, 2004, 1 page, V. 3.0, Imperva, Inc.

"Imperva SecureSphere, Securing the Enterprise Application Sphere", Apr. 1, 2004, 2 pages, V. 2.0, Imperva, Inc.

"Securing the Enterprise Application Sphere with WebCohort SecureSphere 1.2", 2002, 16 pages, WebCohort Inc.

"Securing Your Web Applications Using WebCohort SecureSphere 1.5", 2002, 25 pages, WebCohort Inc.

"Traditional Web Application Security vs. SecureSphere, A Comparison of Hard Trigger Rules vs. Correlated Attack Validation", 2004, 10 pages, Imperva, Inc.

"Web Intrusion Prevention: Securing the Enterprise Application Sphere", 2002, 12 pages, WebCohort Inc.

"WebCohort Introduces SecureSphere 1.2, The First Intrusion Prevention Solution for the Entire Enterprise Application Sphere", Internet Wire, Oct. 30, 2002, 2 pages, WebCohort Inc.

"WebCohort—Products—SecureSphere—Anomaly Detection", 2003, 1 page, WebCohort Inc.

"WebCohort—Products—SecureSphere—Network Architecture", 2003, 1 page, WebCohort Inc.

"WebCohort—Web application and database intrusion prevention," 2002, 2 pages, WebCohort Inc.

\* cited by examiner

DYNAMIC LEARNING METHOD AND ADAPTIVE NORMAL BEHAVIOR PROFILE (NBP) ARCHITECTURE FOR PROVIDING FAST PROTECTION OF ENTERPRISE APPLICATIONS

CROSS REFERENCE TO RELATED APPLICATIONS

This application is a continuation of U.S. Pat. No. 7,743, 420, filed on Nov. 19, 2004, which further claims priority from U.S. Provisional Patent Application No. 60/526,098 filed on Dec. 2, 2003, the entire disclosures of which applications are incorporated by reference.

BACKGROUND OF THE INVENTION

1. Technical Field of the Invention

The present invention relates generally to comprehensive security systems, and more particularly, to dynamic learning methods and adaptive normal behavior profile (NBP) architectures utilized by comprehensive security systems.

2. Description of the Related Art

Accessibility, ubiquity and convenience of the Internet rapidly changed the how people access information. The World Wide Web ("WWW"), usually referred to as "the web", is the most popular means for retrieving information on the Internet. The web enables user access to practically an infinite number of resources, such as interlinked hypertext documents accessed by a hypertext transfer protocol (HTTP), or extensible markup language (XML) protocols from servers located around the world.

Enterprises and organizations expose their business information and functionality on the web through software applications, usually referred to as "enterprise applications". The enterprise applications use the Internet technologies and infrastructures. A typical enterprise application is structured as a three-layer system, comprising a presentation layer, a business logic layer and a data access layer. The multiple layers of the enterprise application are interconnected by application protocols, such as HTTP and structured query language (SQL). Enterprise applications provide great opportunities for an organization. However, at the same time, these applications are vulnerable to attack from malicious, irresponsible or criminally minded individual. An application level security system is required to protect enterprise applications from web hackers.

In related art, application level security systems prevent attacks by restricting the network level access to the enterprises applications, based on the applications' attributes. Specifically, the security systems constantly monitor requests received at interfaces and application components, gather application requests from these interfaces, correlate the application requests and match them against predetermined application profiles. These profiles comprise a plurality of application attributes, such as uniform resource locators (URLs), cookies, users' information, Internet protocol (IP) addresses, query statements and others. These attributes determine the normal behavior of the protected application. Application requests that do not match the application profile are identified as potential attacks.

An application profile is created during a learning period through which the security system monitors and learns the normal behavior of users and applications over time. The security system can apply a protection mechanism, only once the profile of a protected application is completed, i.e., when sufficient data is gathered for all attributes comprised in the profile. In addition, some security systems require that the application profile be manually defined. These requirements limit the ability of those security systems to provide a fast protection, since substantial time is required (usually days) in order to complete the application profile. Furthermore, this technique limits security systems from being adaptive to changes in application's behavior.

Therefore, in the view of the limitations introduced in the related art, it would be advantageous to provide a solution that enables a fast protection of enterprise applications by an application level security system.

SUMMARY OF THE INVENTION

The invention has been made in view of the above circumstances and to overcome the above problems and limitations of the prior art.

Additional aspects and advantages of the invention will be set forth in part in the description that follows and in part will be obvious from the description, or may be learned by practice of the invention. The aspects and advantages of the invention may be realized and attained by means of the instrumentalities and combinations particularly pointed out in the appended claims.

A first aspect of the invention provides a method for dynamic learning the behavior of enterprise applications for providing the fast protection of the enterprise applications. The method comprises receiving enterprise application events processed by network sensors and analyzing the enterprise application events. The method further comprises generating an adaptive normal behavior profile (NBP), wherein the adaptive NBP comprises at least a plurality of profile items and each of the plurality profile items comprises a plurality of profile properties. The method further comprises performing statistical analysis to determine if the adaptive NBP is stable. The stable adaptive NBP is distributed to the network sensors connected to the protected devices, and the enterprise applications can reside in the protected device. The protected device can be a web server or a database server. Each of the network sensors can be one of a structured query language (SQL) sensor and a hypertext transfer protocol (HTTP) sensor.

The adaptive NBP has a hierarchic data structure, and can represents a HTTP profile or a SQL profile. The profile property comprises a descriptive value of its corresponding profile item, e.g., maintenance information. The maintenance information can comprise a current state of the profile property, a creation time of the profile property, a link to another profile item, a timestamp of last update, an update sequence number and a number of observations of the corresponded profile item. The current state can be a learn state, an enforceable state and a non-enforceable state, and the profile item comprises at least one of a current state of the profile item and a distinguishable name. More particularly, the current state is at least one of a learn state, a protect state, a deleted state, a decayed state and a merged state.

Analyzing the application events comprises performing a lexical analysis and performing a syntax analysis. The lexical analysis comprises breaking each of the plurality of application events into tokens, and creating a representation of the application event using the tokens' properties. The syntax analysis comprises breaking each of the enterprises application events into functional units, and classifying the functional units as identification units and property units. The identification units are used for identifying the enterprise application event, and the property units describe the property of the enterprise application event. The property units having at least one similar identification unit are gathered to form the profile property, and attached to the profile property corresponding to the profile item. The adaptive NBP is considered stable if at least one of the plurality of profile items or at least one of the plurality of profile properties of the adaptive NBP is stable.

In one embodiment, performing the statistical analysis comprises computing the Bayesian probability for a mistake. In another embodiment, the statistical analysis comprises computing a percentage of learning progress for each profile item and profile property out of the total number of the enterprise application events received over a predefined time, and determining the respective profile item or the profile property as stable if the percentage of learning progress exceeds a predefined threshold.

A second aspect of the invention provides a computer program product, comprising computer-readable media with instructions to enable a computer to implement a method for dynamic learning the behavior of enterprise applications for providing fast the protection of the enterprise applications. The method embodied on the computer program product comprises receiving enterprise application events processed by network sensors and analyzing the enterprise application events. The method embodied on the computer program product further comprises generating an adaptive normal behavior profile (NBP), wherein the adaptive NBP comprises at least a plurality of profile items and each of the plurality profile items comprises a plurality of profile properties. The method embodied on the computer program product further comprises performing statistical analysis to determine if the adaptive NBP is stable. The stable adaptive NBP is distributed to the network sensors connected to the protected devices.

The computer program product creates an adaptive NBP that has a hierarchic data structure, and can represents a HTTP profile or a SQL profile. The profile property comprises a descriptive value of its corresponding profile item, e.g., maintenance information. The maintenance information can comprise a current state of the profile property, a creation time of the profile property, a link to another profile item, a timestamp of last update, an update sequence number and a number of observations of the corresponded profile item. The current state can be a learn state, an enforceable state and a non-enforceable state, and the profile item comprises at least one of a current state of the profile item and a distinguishable name. More particularly, the current state is at least one of a learn state, a protect state, a deleted state, a decayed state and a merged state.

The computer program product analyzes the application events comprises performing a lexical analysis and performing a syntax analysis. The lexical analysis comprises breaking each of the plurality of application events into tokens, and creating a representation of the application event using the tokens' properties. The syntax analysis comprises breaking each of the enterprises application events into functional units, and classifying the functional units as identification units and property units. The identification units are used for identifying the enterprise application event, and the property units describe the property of the enterprise application event. The property units having at least one similar identification unit are gathered to form the profile property, and attached to the profile property corresponding to the profile item. The adaptive NBP is considered stable if at least one of the plurality of profile items or at least one of the plurality of profile properties of the adaptive NBP is stable.

In one embodiment, the computer program product performs the statistical analysis by computing the Bayesian probability for a mistake. In another embodiment, the statistical analysis comprises computing a percentage of learning progress for each profile item and profile property out of the total number of the enterprise application events received over a predefined time, and determining the respective profile item or the profile property as stable if the percentage of learning progress exceeds a predefined threshold.

A third aspect of the present invention is a non-intrusive network security system that utilizes a dynamic process for learning the behavior of enterprise applications to allow for the fast protection of the enterprise applications. The security system comprises a plurality of network sensors capable of collecting, reconstructing and processing enterprise application events and a secure server capable of building adaptive normal behavior profiles (NBPs). The security system further comprises connectivity means enabling the plurality of network sensors to monitor traffic directed to at least devices that require protection. In the security system, the enterprise applications reside in the protected devices, and the protected devices can be web servers and/or a database servers. Each of the network sensors can be a structured query language (SQL) sensor and/or a hypertext transfer protocol (HTTP) sensor.

In the security system, the adaptive NBP is a hierarchic data structure that comprises a plurality of profile items and each of the plurality of the profile items comprises a plurality of profile properties. The adaptive NBP represents at least one of a HTTP profile and a SQL profile. The adaptive NBP is considered stable if at least one of the plurality of profile items or at least one of the plurality of profile properties of the adaptive NBP is stable. The secure sever is capable of distributing the stable adaptive NBP to the network sensors connected to the protected devices.

In the security system, the dynamic learning process comprises receiving the enterprise application events processed by the network sensors, analyzing the enterprise application events and generating the adaptive NBP. The security system analyzes the application events by performing a lexical analysis and performing a syntax analysis. The lexical analysis comprises breaking each of the plurality of application events into tokens, and creating a representation of the application event using the tokens' properties. The syntax analysis comprises breaking each of the enterprises application events into functional units, and classifying the functional units as identification units and property units. The identification units are used for identifying the enterprise application event, and the property units describe the property of the enterprise application event. The property units having at least one similar identification unit are gathered to form the profile property, and attached to the profile property corresponding to the profile item. The adaptive NBP is considered stable if at least one of the plurality of profile items or at least one of the plurality of profile properties of the adaptive NBP is stable. In addition, the security system performs a statistical analysis to determine if the adaptive NBP is stable. For example, in one embodiment, the security system performs the statistical analysis by computing the Bayesian probability for a mistake. In another embodiment, the statistical analysis comprises computing a percentage of learning progress for each profile item and profile property out of the total number of the enterprise application events received over a predefined time, and determining the respective profile item or the profile property as stable if the percentage of learning progress exceeds a predefined threshold.

A fourth aspect of the present invention is an adaptive normal behavior profile (NBP) architecture that enables the fast protection of enterprise applications. The architecture comprises a plurality of profile items, wherein each of the plurality of profile items comprises a plurality of profile properties. The normal behavior profile (NBP) architecture is a hierarchic data structure, and can represent at least one of a HTTP profile and/or a SQL profile. Each of the plurality of profile properties comprises a descriptive value of its corresponding profile item. For example, each of the profile properties may comprise maintenance information. The maintenance information may comprise at least one of a current state of the profile property, a creation time of the profile property, a link to another profile item, a timestamp of last update, an update sequence number and a number of observations of the corresponding profile item. The current state is at least one of a learn state, an enforceable state and a non-enforceable state. Each of the plurality of profile items comprises at least a current state of the profile item and a distinguishable name. The current state comprises at least one of a learn state, a protect state, a deleted state, a decayed state and a merged state.

The profile items of the HTTP profile comprise at least a web server group, a web application, a virtual folder, a URL, a cookie and a parameter. The profile property corresponding to a web server group items comprises at least a list of acceptable web application aliases. The profile properties corresponding to the virtual folder item comprise at least a list of sub-folders of the virtual folder, an indication as whether the virtual folder is directly accessible and properties corresponding to a URL item. The profile properties corresponding to the URL item comprise at least a first indication as whether the URL maintained by the URL item generates a binding HTML form, a second indication as whether the URL maintained by the URL item is used as the first URL of a new session, broken links and broken references. The profile properties corresponding to the cookie item comprise at least one of a length restriction on a cookie value and an indication as whether the cookie item represents a set of actual cookies with the same prefix. The profile properties corresponding to the parameter item comprise at least one of a list of allowed aliases for the parameter name, a length restriction on the parameter's value, a parameter type, a first indication as whether the parameter is bounded to a HTTP response, a second indication as whether the parameter is required for a URL and a third indication as whether the parameter represents a set of actual parameters with a same prefix.

The profile items of the SQL profile comprise at least one of a database server group, a source group, a table access and a query. The profile properties corresponding to the source group items comprise at least a list of source IP addresses, a list of client applications, a list of database accounts, a list of tables and views for the source group, a first indication as whether an access profile should be enforced for the source group, a second indication as whether to allow database manipulation commands for the source group, a third indication as whether to allow access to a system administrator, a fourth indication as whether to allow access to tables in non-default schemas and a fifth indication as whether to allow access to tables in non-default schemas. The profile property corresponding to the table access item comprises at least an enforcement mode for each type of query, and the profile property corresponding to the query item comprises at least the SQL query.

The above and other aspects and advantages of the invention will become apparent from the following detailed description and with reference to the accompanying drawing figures.

BRIEF DESCRIPTION OF THE DRAWINGS

The accompanying drawings, which are incorporated in and constitute a part of this specification illustrate embodiments of the invention and, together with the description, serve to explain the aspects, advantages and principles of the invention. In the drawings.

DESCRIPTION OF THE INVENTION

Figure 1:
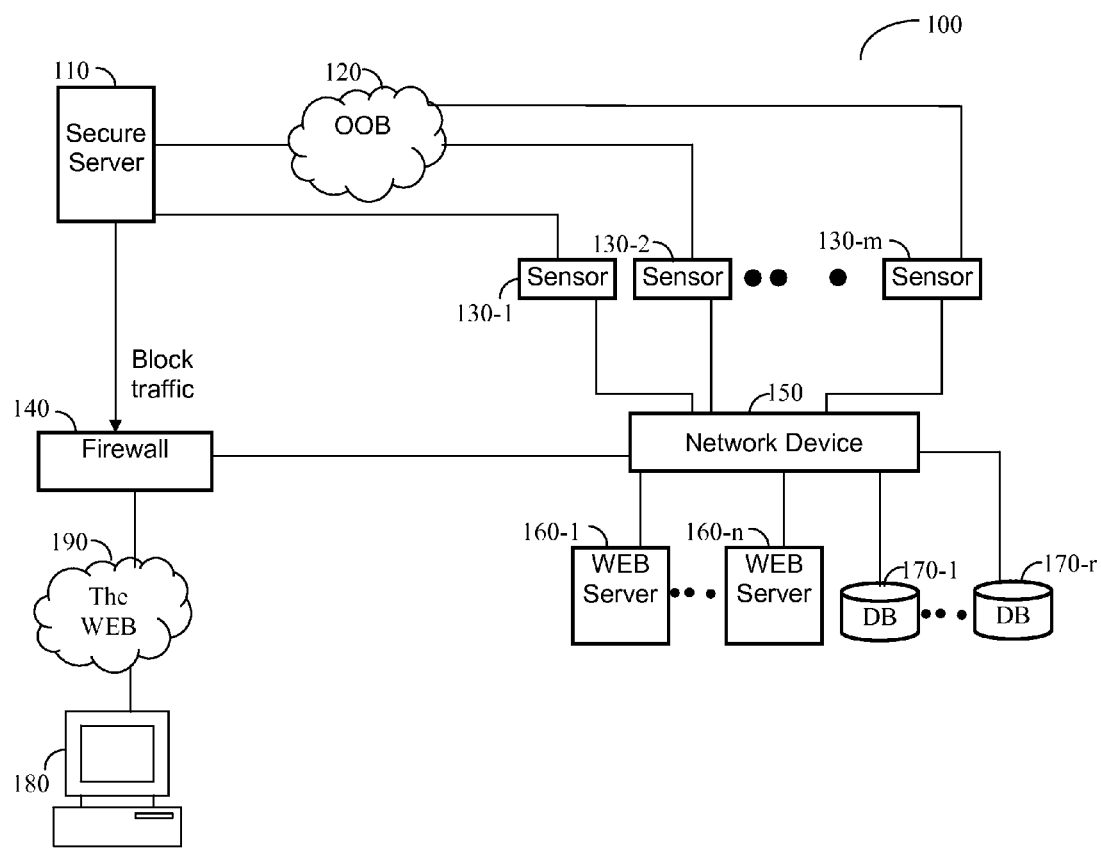
FIG. 1 is an exemplary diagram of an application level security system for illustrating the principles of the disclosed invention.

Referring to FIG. 1, an exemplary application level security system 100 for illustrating the principles of the present invention is shown. A security system 100 comprises a plurality of network sensors 130-1, 130-2, 130-*m* connected to a secure server 110. The network sensors 130 may be connected to secure server 110 through a conventional network or through an out-of-band network (OOB) 120 for transferring traffic over a dedicated and secure network that is completely separated from the production traffic. A network sensor 130 is placed on each network segment that is coupled to the web servers 160, 160-*n* and the database servers 170, 170-*r* to be protected. In one embodiment, the network sensor 130 is a passive sniffing device that taps, gathers and reconstructs requests sent to the protected servers 160, 170 from an attacker machine 180. Network device 150 may be, but is not limited to, a hub, a switch, a tap device, and so on. Network sensor 130 taps the traffic sent to and from Web servers 160 and database servers 170. Network sensor 130 is not installed in the line of traffic between client 180 and Web servers 160 or database server 170, thus traffic is copied to network sensors 130 and at the same time passing directly through. In another embodiment (not shown), the network sensors 130-1, 130-2, 130-*m* are configured to operate in the line of traffic. Each network sensor 130 processes incoming application requests, which are sent as application events to the secure server 110.

The security system 100 operates in two different modes: a LEARN mode and a PROTECT mode. In one embodiment, in the LEARN mode, the security system 100 monitors and learns the normal behavior of users and applications over time, and builds an adaptive normal behavior profiles (NBP) for each protected entity. In the PROTECT mode, the security system 100 compares real time communications (i.e., application events) to the adaptive NBPs. Deviations from the adaptive NBP are defined as anomalies. Anomalies are further analyzed by advanced correlation and aggregation mechanisms to ensure that the anomalies are part of an attack. The analysis uses positive logic for intrusion detection. That is, if an event matches a profile, it is considered as a normal event, else if the event does not match any profile, it is considered as an irregular event.

Application events may be collected either by analyzing network level protocol attributes of incoming network traffic, or by polling information about recent events from the web servers 160 or the database servers 170. The network sensor 130 is capable of reconstructing application events from a plurality of network level protocols comprising, but not limited to, Oracle Net8™, Microsoft SQL Server™ TDS, Sybase TDS, OpenGroup DRDA, HTTP, encrypted HTTP (HTTPS) and similar applications. In addition, the network sensor 130 is capable of gathering application events by polling information (e.g., SQL queries) from Oracle Database™, Microsoft SQL server and similar systems. Each of network sensors 130-1, 130-2, 130-$m$ operates autonomously, and thus the security system 100 is a scalable system. That is, to protect additional Web applications and databases, the user has just to add additional network sensors 130 to monitor the new protected entity.

Figure 2:
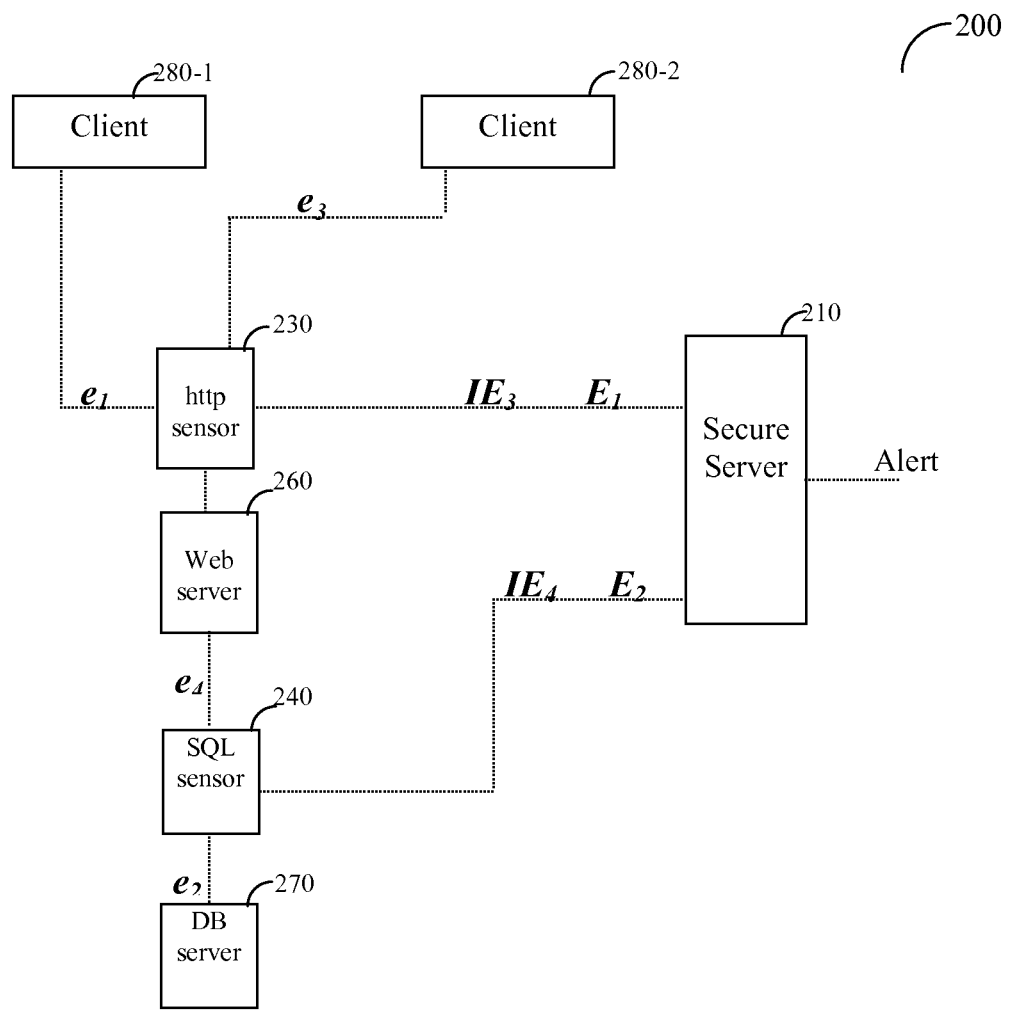
FIG. 2 is an exemplary diagram illustrating the operation of the application level security system in accordance with this invention.

Referring to FIG. 2, an exemplary diagram 200 illustrating the operation of the application level security system 100 is shown. The security system 200 depicted in FIG. 2 comprises two network sensors, a HTTP sensor 230 and a SQL sensor 240. The HTTP sensor 230, capable of gathering and reconstructing HTTP events, collects an HTTP request $e_1$ sent by a client 280-1 to the web server 260. The SQL sensor 240 collects a SQL request $e_2$ by polling the database server 270. The event $e_2$ may be a consequence of request $e_1$. Requests $e_1$ and $e_2$ are processed by sensors 230 and 240, respectively, and are sent as application events $E_1$ and $E_2$ to secure server 210. Subsequently, the secure server 210 executes a profiling process for generating an adaptive NBP for each protected entity, i.e., for the web server 260 and for the database server 270.

To allow fast protection, the security system 200 implements a dynamic learning process for generating the adaptive NBP. Through this process, a decision whether to use an application event for protection or learning is based on a single profile item. Specifically, the generated adaptive NBP comprises a plurality of profile items, wherein each item comprises a plurality of profile properties. The adaptive NBP may be used for protecting the application if at least one profile item is considered stable. In one embodiment, a stable item comprises sufficient information regarding users' or applications' behavior, where sufficiency is based on statistical measures. The statistical measures may be, but not limited to, those described herein.

The adaptive NBP generated by the present invention has a granular architecture allowing decisions to be made for discrete portions of the NBP. Furthermore, the NBP architecture allows the distribution of profile updates between the secure server 210 and the network sensors 230 and 240. The architecture of the adaptive NBP is described in greater detail below.

An approved NBP, i.e., an adaptive NBP that comprises at least one stable profile item, is distributed among the network sensors. A copy held by a network sensor may comprise only a subset of the information existing in the original NBP. The adaptive NBP is distributed from secure server to network sensors through a synchronous communication channel. The network sensors also use this channel to retrieve NBP updates.

In this example, the secure server 210 generates two adaptive NBPs, the first NBP characterizes the web server 260 and is uploaded to the HTTP sensor 230, while the second NBP characterizes the database server 270 and is uploaded to the SQL sensor 240. Once, the NBPs are uploaded to the sensors 230 and 240, the security system 210 can protect the web server 260 and the database server 270 using the stable properties of the NBPs. It should be noted that the security system 210 always protects the web server 260 and the database server 270 using at least signatures detection, protocol analysis and other network means.

In the PROTECT mode, the secure server 210 identifies deviations from at least one stable profile item in the adaptive NBP, analyzes the deviations, detects intrusions and block attacks according to a predefined security policy. Specifically, a HTTP request e3 sent by a client 280-2 to the web server 260 is captured by HTTP the sensor 230 and classified. The request e3 is compared with a copy of an adaptive NBP comprising at least one stable profile item maintained by the HTTP sensor 230. If the request e3 deviates from the adaptive NBP, then the HTTP sensor 230 classifies it as anomalous and sends an irregular event (IE3) to the secure server 210, which further processes the irregular event (IE3) to determine whether or not an intrusion takes place. On the other hand, if the request e3 matches the adaptive NBP, then the HTTP sensor 230 may discard this event, or alternatively, send the request to the secure server 210 for the purpose of amending or updating the adaptive NBP. Simultaneously, a SQL request e4 generated by the web server 260, possibly as a consequence of request e3, is captured by the SQL sensor 240. If the request e4 deviates from the adaptive NBP maintained by SQL sensor 240, this event is declared as irregular event (IE4) and sent to the secure server 210 for further analysis. Both events e3 and e4 may be compared against one stable profile item in each NBP maintained by the HTTP sensor 230 and the SQL sensor 240. The secure server 210 declares an intrusion alert when an event or a series of events triggers a rule based mechanism. The rule-based mechanism includes a predefined set of correlation rules that allow to easily correlate different types of anomalies and set alerts for a combination of anomalies that increases the probability of an attack. The correlation rules are predefined by the user. The rule-based mechanism employs a state machine to define and evaluate correlations between anomalies in real-time. For example, the two irregular events $IE_3$ and $IE_4$ are correlated into a single intrusion alert.

The disclosed security system creates, through the dynamic learning process, the adaptive NBPs without any prior knowledge of the enterprise application semantics. However, the NBPs may be automatically updated while the system is operating in the PROTECT mode. Specifically, adaptive NBPs are updated when the enterprise application undergoes major changes. During the dynamic learning process, the security system tracks certain characteristics in the user activity and stores the tracking data in an internal database. This raw tracking data is not considered as a profile until the data is compiled, analyzed and formed into an adaptive NBP structure.

Figure 3:
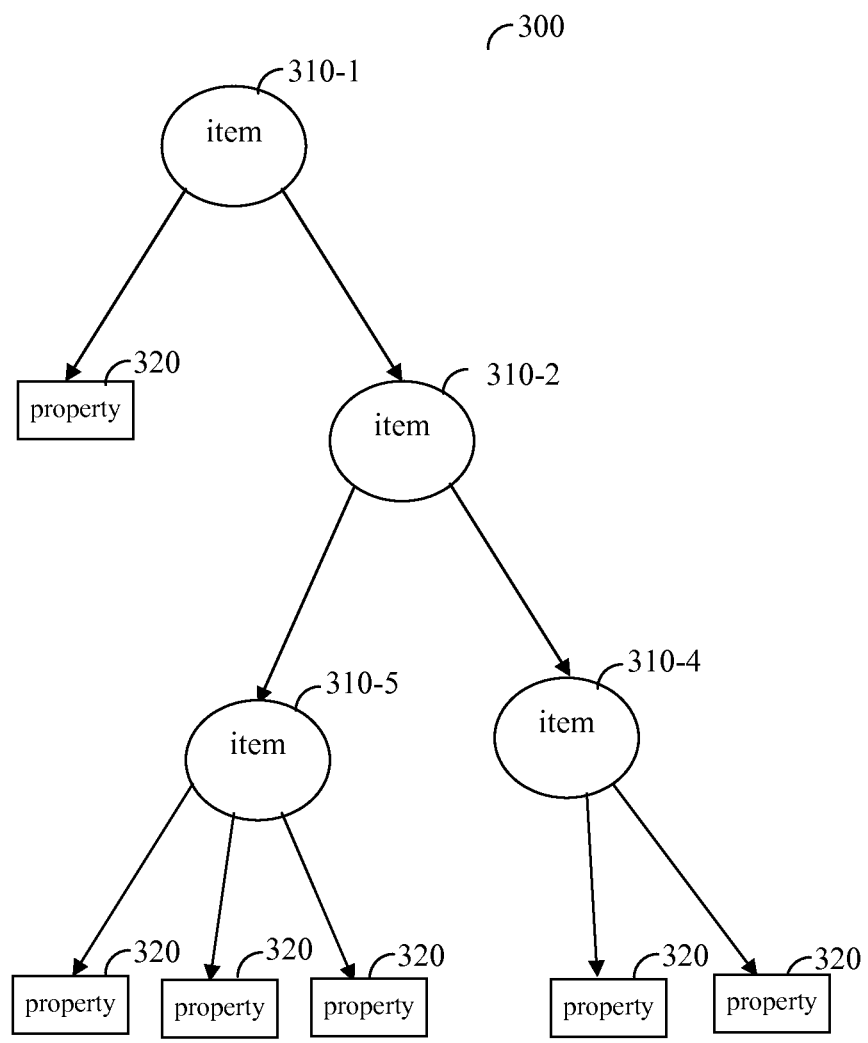
FIG. 3 is a non-limiting diagram of an adaptive NBP architecture.

Referring to FIG. 3, an exemplary diagram illustrating the architecture of an adaptive NBP 300 in accordance with the present invention is shown. The adaptive NBP is hierarchic data structure (e.g., a directed tree) comprising a plurality of profile items 310-1, 310-2, 310-4, 310-5 holding a plurality of corresponding profile properties 320-1, 320-2, 320-3, 320-4, 320-5, 320-6. The child of a profile item 310 may be at least a profile property 320 or another profile item 310. The profile items 310 and properties 320 characterize one or more enterprises applications installed on a server, e.g., a web server or a database server. The profile items 310 are independent, and are the smallest profile entity that can be conveyed individually from the secure server 110 to the network sensors 130. A profile property 320 is a descriptive value of a respective profile item 310. Therefore, an observation of an event related to a profile item results in updating all profile properties of that item. The profile properties 320 contain the actual data of the items, the property type, their current state and an awareness flag. The current state may be either a LEARN state, an ENFORCEABLE state, or a NON-ENFORCEABLE state. In the LEARN state, events relating to the respective profile property are gathered. In the ENFORCEABLE state, the respective profile property contains sufficient amount of information so that this property can be uploaded to a network sensor and used for detecting attacks. The NON-ENFORCEABLE state means that the profile property cannot be uploaded to a network sensor. Each of the profile properties 320 have their own state, but they cannot be handled independently of their containing item (e.g., a specific property cannot be removed from a profile item). The current state may be automatically determined by the secure server 110 or manually by the user. The awareness flag indicates whether this property should be conveyed to a network sensor. A copy of the adaptive NBP transmitted from the secure server 110 to the network sensors 130 may comprise a subset of items affected by the system's configuration (e.g., entities protected by the network sensor 130, policy regarding stable item, and so on) and a subset of properties for each profile item.

Each profile item 310 is identified by a unique hierarchic key, thus the entire set of ancestors from an item's direct parent and up to the root of the profile tree can be determined by a single key. As a parent item may contain various child items, a parent item (e.g., item 310-2) must comprise at least one profile property that explicitly denominates the child profile items (e.g., 310-4 and 310-5) of the parent item. Each profile item 310 is further identified by its implied type and preferably its distinguished name, which are used for classification purposes. Furthermore, each profile item 310 maintains information comprising, but not limited to, a creation time, a current state, a link to another profile item, a timestamp of last update, an update sequence number, a number of observations of item either at the network sensors 130 or the secure server 110 and a named collection of child items. The current state of a profile item may be a LEARN state, a PROTECT state, a DELETED state, a DECAYED state, or a MERGED state. In a LEARN state, events regarding to the respective profile item are gathered. In a PROTECT state, sufficient amount of information is gathered and the profile item is uploaded to a network sensor. A DELETED state indicates that the profile item was deleted. A DECAYED state indicates that a link to the profile item is broken. A MERGED state indicates that the respective profile item was merged with another profile item. The current state may be automatically determined by the secure server 110 or manually by the user.

Figure 4:
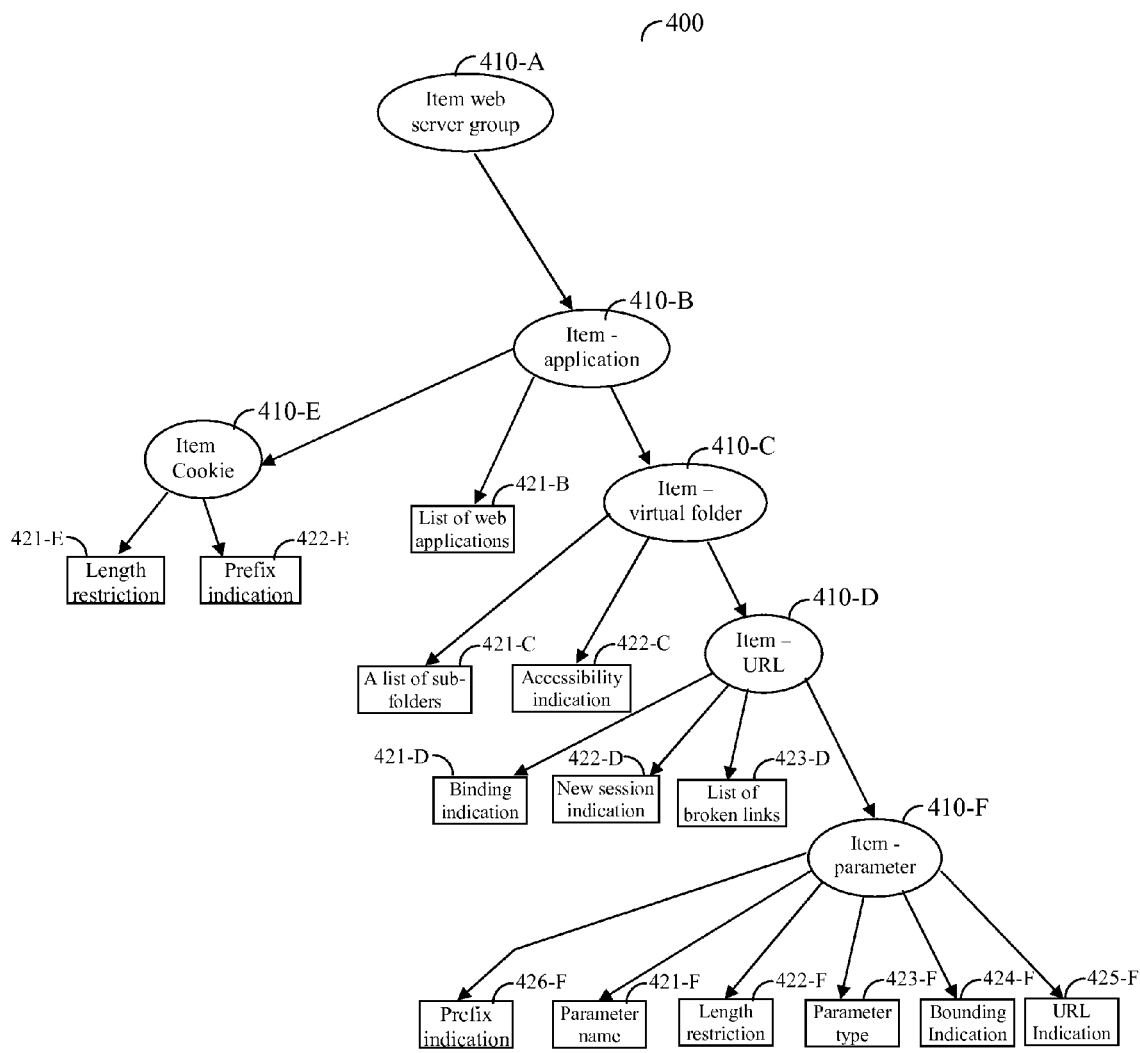
FIG. 4 is a non-limiting diagram of an adaptive NBP architecture characteristic to a HTTP profile.

FIG. 4 shows a non-limiting architecture of an adaptive NBP 400 characteristic to HTTP. The profile items of NBP 400 comprise a web server group 410-A, an application (or host) 410-B, a virtual folder 410-C, a URL 410-D, a cookie 410-E and a parameter 410-F. The web server group item 410-A is the root of the NBP structure 400 and its child is the web application item 410-B. The web application item 410-B describes a single web application in the web server group. The children of the application item 410-B are the virtual folder item 410-C, which defines a virtual folder within a web application and the cookie item 410-E. The distinguished name of the virtual folder item 410-C is the full path of the folder from the virtual root. The cookie item 410-E comprises cookies for a single Web application of its parent item 410-B. The distinguished name of the cookie item 410-E is the name of the cookie. The URL item 410-D is the child of virtual folder item 410-C and describes a single URL within a web application. The distinguished name of the URL item 410-D is the full path of the virtual folder (maintained by item 410-C) together with the HTTP method (e.g., GET or POST). The parameter item 410-F is the child of URL item 410-4 and describes a list of parameters of HTTP requests submitted to a web server. The distinguished name of the parameter item 410-F is the parameter name within the URL.

Each of items 410 may comprise at least one profile property 420 containing the descriptive value of the item. Specifically, the profile property 421-B of application item 410-B is a list of acceptable web application (or host) aliases. The virtual folder item 410-C comprises two profile properties 421-C, 422-C holding, respectively, a list of sub-folders of a virtual folder and indication whether the virtual folder is directly accessible. The profile properties 421-D, 422-D of URL item 410-D comprise two indications, respectively, with one indicating whether the URL maintained by the item generates HTML form used for binding parameter values, and the other indicating whether the URL can be used as the first URL of a new session. In addition, the profile property 423-D comprises a list of identified broken links and broken references. The cookie property 421-E is the length restriction on the cookie values and the property 422-E is an indication whether the cookie represents a set of actual cookies with the same prefix. The parameter properties 421-F, 422-F, 423-F, 424-F, 425-F and 426-F, respectively, comprise a list of allowed aliases for the parameter name, length restriction on the parameter's value, a parameter type, an indication whether the parameter is bounded to a HTTP response, an indication whether the parameter is required for a URL, and an indication whether the parameter represents a set of actual parameters with the same prefix. As can be noted, the web server group item 410-A does not comprise any additional profile properties.

A profile property may further comprise maintenance information comprising, but not limited to, a current state of the profile property, a creation time of the profile property, a link to another profile item, a timestamp of last update, an update sequence number and a number of observations of a corresponding profile item.

Figure 5:
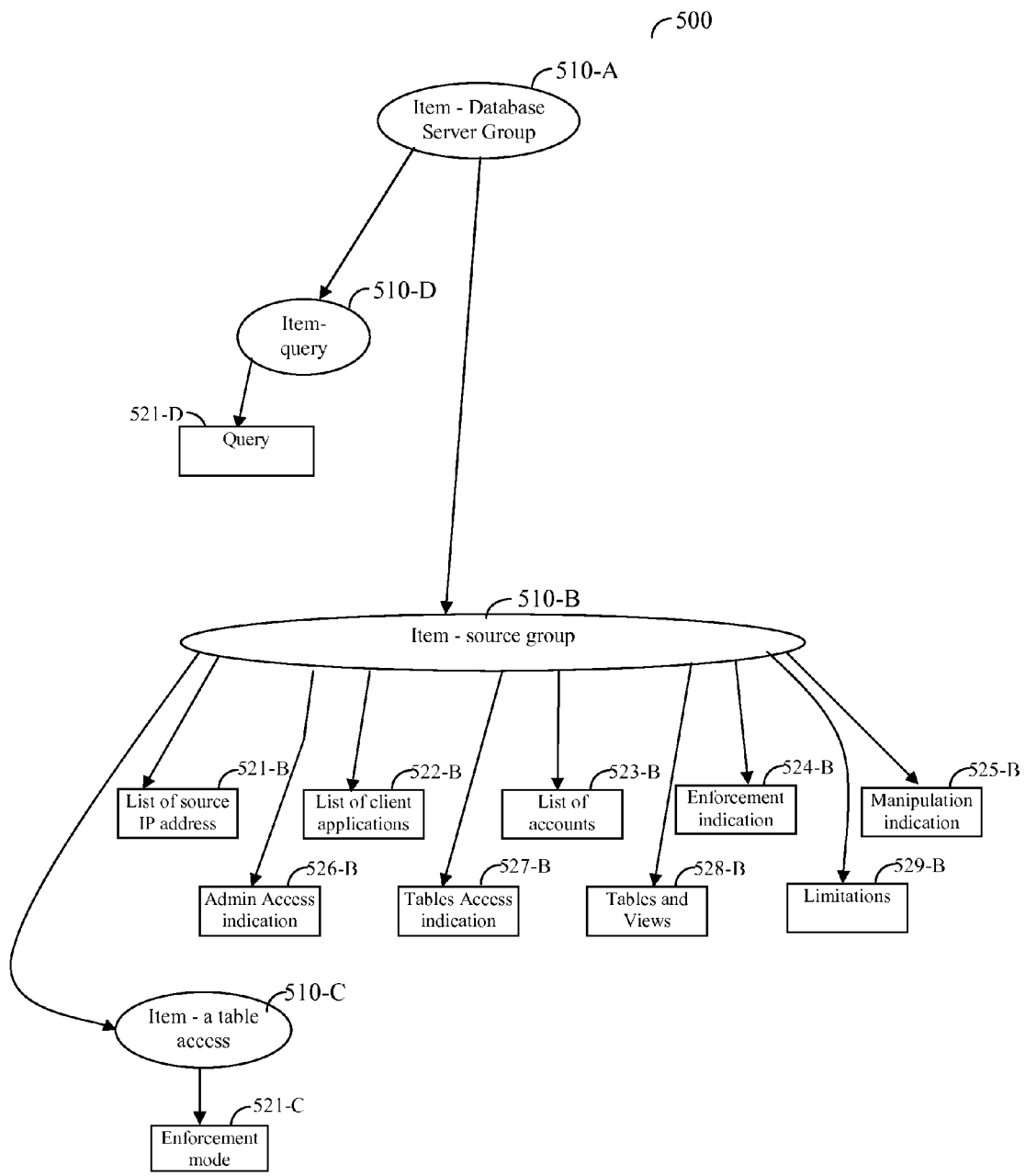
FIG. 5 is a non-limiting diagram of an adaptive NBP architecture characteristic to a SQL profile.

Referring to FIG. 5, a non-limiting architecture of an adaptive NBP architecture 500 that characterizes a SQL profile is shown. The items of NBP 500 comprise a database server group 510-A, a source group 510-B, a table access 510-C and a query 510-D. The database server group item 510-A is the root of the NBP 500 and its children are the source group item 510-B and the query item 510-D. The source group item defines a homogeneous group of database clients having access to database servers. The child of source group item 510-B is the table access item 510-C, which defines the access profile of database clients to a database table. The distinguished name of table access item 510-C is the name of the table. The query item 510-D defines a specific SQL query and its distinguished name is the normalized text of the query. The distinguished names of database server group item 510-A and source group item 510-B comprise default values and are not used for classification.

Each of items 510 may comprise at least one profile property 520 containing the descriptive value of the item. Specifically, the profile properties 521-B, 522-B and 523-B of source group item 510-B comprise a list of source IP address, a list of client applications, and a list of database accounts, each of these lists defines the source group, i.e., the clients that can access database servers. Furthermore, profile properties 524-B, 525-B, 526-B, 527-B, 528-B and 529-B comprise an indication whether the access profile should be enforced for this source group, an indication whether to allow database manipulation commands for this source group, an indication whether to allow access to a system administrator, an indication whether to allow access to tables in non-default schemas, tables and views for this source group, and limitations on the operations of the source group. The profile property 521-C of the table access item 510-C defines the enforcement mode for each type of query, e.g., SELECT, UPDATE, DELETE, INSERT, and so on. The profile property 521-D holds the SQL query. As can be noted, database server group item 510-A does not comprise additional profile properties. It should be noted by a person skilled in the art that these examples are intended for purposes of demonstration only and are not intended to limit the scope of the disclosed invention. As described above for a HTTP profile item, a SQL profile item can have a LEARN state, a PROTECT state, a DELETED state, a DECAYED state and a MERGED state.

Figure 6:
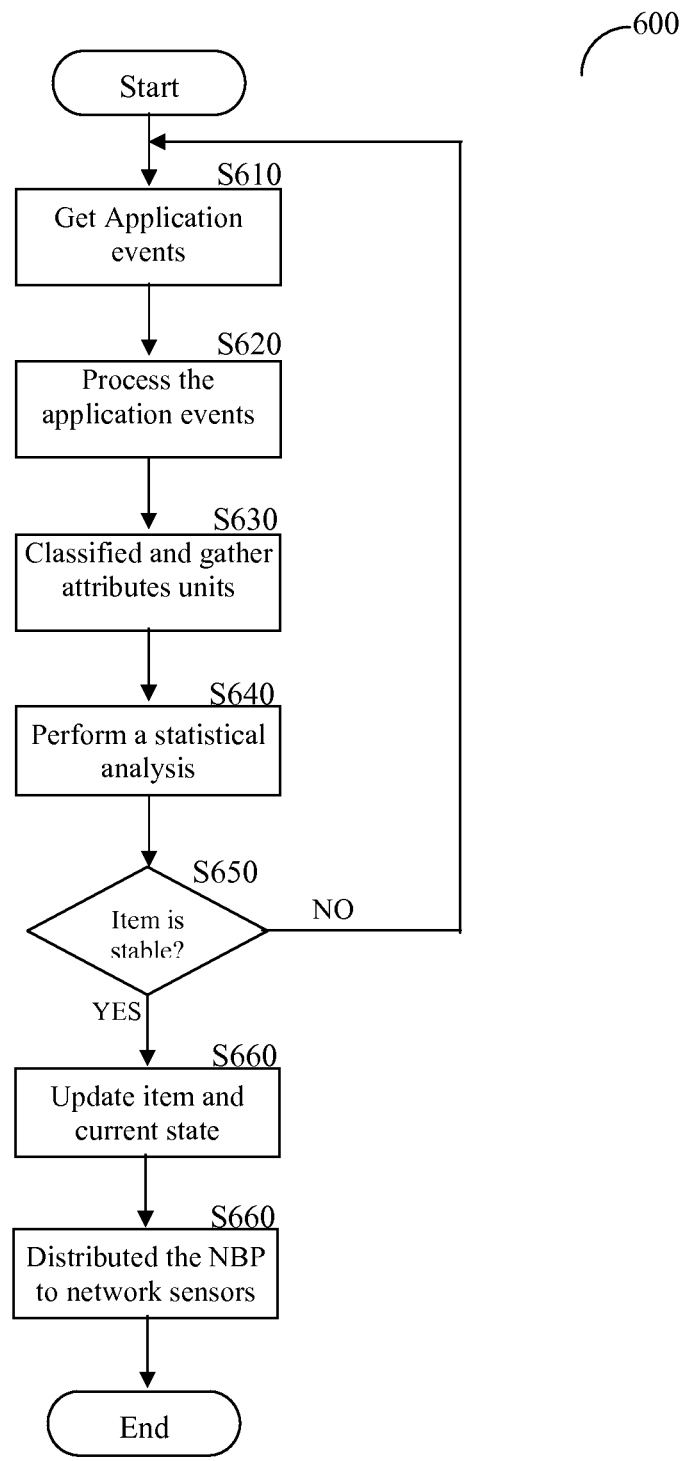
FIG. 6 is an exemplary flowchart describing the dynamic learning process in accordance with an exemplary embodiment of this invention.

Referring to FIG. 6, an exemplary flowchart 600 describing the dynamic learning process, in accordance with an exemplary embodiment of the present invention is shown. The dynamic learning process generates the adaptive NBPs described in greater detailed above. At S610, application events processed by a network sensor 130 are received at the secure server 110. At S620, the application events are analyzed to create the adaptive NBP. Specifically, in one embodiment, the secure server 110 performs a lexical analysis and a syntax analysis to create the NBP. When performing a lexical analysis, the event is broken into tokens and a representation of the event based on token properties is created. SQL queries are modeled using a lexical analysis by replacing any literals with standard placeholders. When performing a syntax analysis of application events are broken into functional units. Some of the units are used for the purpose of identification of the event (the "identification units") and others are considered to be properties (the "property units"). At S630, the property units having similar identification units are classified, gathered and attached to their respective profile item. For example, URLs having the same path are unified and added to the URL item 410-D. At S640, a statistical analysis is performed to determine if the profile item or profile property is stable. In one embodiment, the statistical analysis computes the percentage of learning progress out of the total number of application events collected over time. If the percentage of learning progress exceeds a predefined threshold, the item is considered stable. The percentage of learning progress is computed for both a profile property and its respective item. In another embodiment, the statistical analysis may be the probability for mistakes computed using Bayesian methods. At S650, a check is made to determine if the item or property is stable, and if so, at S660, the current state of the profile item and property are respectively changed to a PROTECT state and an ENFORCEMENT state; otherwise, execution continues with S610. At S670, the adaptive NBP that comprises at least one stable item is distributed to the network sensors 130 and then the security system 100 can protect the protected servers using the stable items properties of the NBP.

It should be noted that in the protect mode of the security system 100 protection is achieved based on at least one stable item or one stable property comprised in the adaptive NBP. For example, if the length for a first parameter item in a URL is stable and the length a second parameter is not, then the enforcement is made only for the first parameter but not for the second. The processes for determining the stability of a parameter item are discussed above.

In accordance with an embodiment, adaptive NBPs are distributed to the network sensors through a proprietary protocol. The protocol provides at least the following operations: a) add a profile item together with its descendants to an adaptive NBP residing in a network sensor; b) update the NBP if an existing profile item is altered; and c) remove an item and its descendants from the NBP. Any changes made by the secure server 110 are immediately imposed onto the network sensors 130.

The present invention can be implemented in software, hardware, firmware or various combinations thereof. In an embodiment of the present invention, the elements are implemented in software that is stored in a memory and that configures and drives a digital processor situated in the respective wireless device. The software can be stored on any computer-readable media for use by or in connection with any suitable computer-related system or method. It will be appreciated that the term "predetermined operations" and the term "computer system software" mean substantially the same thing for the purposes of this description. It is not necessary to the practice of the present invention that the memory and the processor be physically located in the same place. That is to say, it is foreseen that the processor and the memory might be in different physical pieces of equipment or even in geographically distinct locations.

As used herein, one of skill in the art will appreciate that "media" or "computer-readable media" may comprise a diskette, a tape, a compact disc, an integrated circuit, a cartridge, or any other similar tangible media useable by computers. For example, to distribute computer system software, the supplier might provide a diskette or might transmit the instructions for performing predetermined operations in some form via satellite transmission, via a direct telephone link, or via the Internet. More specific examples of computer-readable media would comprise an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CD-ROM) (optical).

Although computer system software might be "written on" a diskette, "stored in" an integrated circuit, or "carried over" a communications circuit, it will be appreciated that, for the purposes of this discussion, the computer usable media will be referred to as "bearing" the instructions for performing the predetermined operations. Thus, the term "bearing" is intended to encompass the above and all equivalent ways in which instructions for performing predetermined operations are associated with a computer usable media.

Therefore, for the sake of simplicity, the term "program product" is hereafter used to refer to a computer useable media, as defined above, which bears instructions for performing predetermined operations in any form.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A method performed by network sensors and a secure server for protection of applications residing on servers of a secured system, wherein the method comprises:

entering a learn mode of the secured system;
collecting, by the network sensors, application events by one or more of analyzing network level protocol attributes to reconstruct application requests and polling information about recent application events from the servers on which the applications reside;
analyzing the application events;
generating a normal behavior profile (NBP) based on the analysis of the application events, wherein the NBP comprises at least a plurality of profile items and each of the plurality profile items comprises a profile property;
performing in the secure server analysis on the NBP, wherein the analysis comprises:
  computing a percentage of learning progress for each profile item out of the total number of the application events received over a predefined time; and
  determining the respective profile item is stable if the percentage of learning progress exceeds a predefined threshold; and
exiting the learn mode and entering a protect mode for the secured system for at least the profile items determined to be stable.

2. The method of claim 1, wherein the method further comprises distributing at least the stable profile items of the NBP to the network sensors coupled to at least one protected device.

3. The method of claim 2, wherein the applications reside in the protected device.

4. The method of claim 3, wherein the protected device is at least one of a web server and a database server.

5. The method of claim 1, wherein each of the network sensors is at least one of a structured query language (SQL) sensor and a hypertext transfer protocol (HTTP) sensor.

6. The method of claim 1, wherein the NBP is a hierarchic data structure.

7. The method of claim 6, wherein each of the profile properties comprises a descriptive value of its corresponding profile item.

8. The method of claim 1, wherein one of the profile properties for each of the profile items comprises at least a current state of the profile property, wherein the current state is one of a learn state and an enforceable state.

9. The method of claim 1, wherein one of the profile properties for each of the profile items comprises at least a current state of the profile property, wherein possible states for the current state include a learn state, an enforceable state, and a non-enforceable state.

10. The method of claim 1, wherein the profile item comprises at least one of a current state of the profile item and a distinguishable name.

11. The method of claim 10, wherein the current state is at least one of a learn state, a protect state, a deleted state, a decayed state and a merged state.

12. The method of claim 1, wherein the NBP represents at least one of a HTTP profile and a SQL profile.

13. The method of claim 1, wherein analyzing the application events further comprises: performing a lexical analysis; and performing a syntax analysis.

14. The method of claim 13, wherein performing the lexical analysis comprises:
  breaking each of the plurality of application events into tokens; and
  creating a representation of the application event using the tokens' properties.

15. The method of claim 13, wherein performing the syntax analysis comprises:
  breaking each of the application events into functional units; and
  classifying the functional units as identification units and property units.

16. The method of claim 15, wherein the identification units are used for identifying the application events.

17. The method of claim 15, wherein the property units describe the properties of the application events.

18. The method of claim 15, wherein generating the NBP further comprises:
  gathering the property units having at least one similar identification unit to form the profile property; and
  attaching the profile property to its corresponding profile item.

19. The method of claim 1, wherein the NBP is an adaptive NBP that is automatically updated while the system is operating in the protect mode.

20. The method of claim 1, wherein the application requests include HTTP requests.

21. The method of claim 1, wherein the network sensors are placed on each network segment that is coupled to the secured servers the applications reside on.

22. The method of claim 1, wherein at least one of the network sensors sniffs traffic.

23. The method of claim 1, wherein at least one of the network sensors operates in the line of traffic.

24. The method of claim 1, further comprising:
  collecting, by one of the network sensors, an additional application event;
  identifying the additional application event as a potential attack based on comparison to only the parts of the NBP determined to be stable.

25. The method of claim 1, wherein the exiting the learn mode and entering the protect mode includes changing a current state of only the profile items determined to be stable to a PROTECT state.

26. The method of claim 1, wherein the exiting the learn mode and entering the protect mode includes distributing at least the profile items determined to be stable to at least one of the network sensors and protecting the applications using only the stable items of the NBP.

27. The method of claim 1, wherein the exiting occurs on a per profile item basis and includes automatically distributing to the network sensors the stable profile items when they are determined to be stable.

28. The method of claim 1, wherein the profile items include a URL item and a parameter item, and wherein the profile properties corresponding to the parameter item include a length restriction on a parameter's value and a parameter type for the parameter.

29. The method of claim 28, wherein at least one of the applications is a web application, and the URL item describes a single URL within that web application.

30. The method of claim 29, wherein the parameter item describes a list of parameters of HTTP requests submitted to a web server.

31. The method of claim 28, wherein the profile items also comprise at least a web application item, a virtual folder item, and a cookie item, wherein the web application item describes a single web application in the web server group, wherein the virtual folder item defines a virtual folder within the web application, and the cookie item comprises cookies for the web application.

32. The method of claim 1, wherein the profile items include one or more of a table access item and a query item, wherein the table access item has profile properties that define the enforcement mode for each type of query, and wherein a query item defines an SQL query and has a profile property that holds the SQL query.

33. The method of claim 32, wherein the table access item defines the access profile of database clients to a database table.

34. The method of claim 32, wherein the types of queries include select, update, delete, and insert.

35. The method of claim 32, wherein the query item's distinguished name is the normalized text of the query.

36. The method of claim 32, wherein the profile items also comprise a source group item that defines a homogeneous group of database clients having access to database servers.

37. The method of claim 1, wherein:
the analyzing the application events comprises:
performing syntax analysis to generate functional units; and
classifying the functional units as identification units and property units, wherein the identification units are used for identifying the application events, and wherein the property units describe the property of the application events; and
the generating the NBP comprises:
gathering the property units having at least one similar identification unit to form the profile property; and
attaching the profile property to its corresponding profile item.

38. A non-transitory, tangible computer-readable media which has stored in it instructions, which when executed by a secure server of a secured system for protection of applications, cause the secure server to perform the steps of:
entering a learn mode;
generating a normal behavior profile (NBP) based on an analysis of application events collected by network sensors that one or more of analyze network level protocol attributes to reconstruct application requests and poll information about recent application events from servers, wherein the NBP comprises at least a plurality of profile items and each of the plurality profile items comprises a profile property;
performing analysis on the NBP, wherein the analysis comprises:
computing a percentage of learning progress for each profile item out of the total number of the application events received over a predefined time; and
determining the respective profile item is stable if the percentage of learning progress exceeds a predefined threshold; and
exiting the learn mode and entering a protect mode for at least the profile items determined to be stable.

39. The computer-readable media of claim 38, wherein the instructions further cause the secure server to perform the step of:
distributing at least the stable profile items of the NBP to the network sensors coupled to at least one protected device.

40. The computer-readable media of claim 39, wherein the applications reside in the protected device.

41. The computer-readable media of claim 40, wherein the protected device is at least one of a web server and a database server.

42. The computer-readable media of claim 38, wherein each of the network sensors is at least one of a structured query language (SQL) sensor and a hypertext transfer protocol (HTTP) sensor.

43. The computer-readable media of claim 38, wherein the NBP is a hierarchic data structure.

44. The computer-readable media of claim 43, wherein each of the profile properties comprises a descriptive value of its corresponding profile item.

45. The computer-readable media of claim 38, wherein one of the profile properties for each of the profile items comprises at least a current state of the profile property, wherein the current state is one of a learn state and an enforceable state.

46. The computer-readable media of claim 38, wherein one of the profile properties for each of the profile items comprises at least a current state of the profile property, wherein possible states for the current state include a learn state, an enforceable state, and a non-enforceable state.

47. The computer-readable media of claim 38, wherein the profile item comprises at least one of a current state of the profile item and a distinguishable name.

48. The computer-readable media of claim 47, wherein the current state is at least one of a learn state, a protect state, a deleted state, a decayed state and a merged state.

49. The computer-readable media of claim 38, wherein the NBP represents at least one of a HTTP profile and a SQL profile.

50. The computer-readable media of claim 38, wherein the analysis of the application events includes a lexical analysis and a syntax analysis.

51. The computer-readable media of claim 50, wherein the lexical analysis comprises:
breaking each of the plurality of application events into tokens; and
creating a representation of the application event using the tokens' properties.

52. The computer-readable media of claim 50, wherein the syntax analysis comprises:
breaking each of the application events into functional units; and
classifying the functional units as identification units and property units.

53. The computer-readable media of claim 52, wherein the identification units are used for identifying the application events.

54. The computer-readable media of claim 52, wherein the property units describe the properties of the application events.

55. The computer-readable media of claim 52, wherein generating the NBP further comprises:
gathering the property units having at least one similar identification unit to form the profile property; and
attaching the profile property to its corresponding profile item.

56. The computer-readable media of claim 38, wherein the NBP is an adaptive NBP that is automatically updated while the system is operating in the protect mode.

57. The computer-readable media of claim 38, wherein the application requests include HTTP requests.

58. The computer-readable media of claim 38, wherein the network sensors are placed on each network segment that is coupled to the secured servers the applications reside on.

59. The computer-readable media of claim 38, wherein at least one of the network sensors sniffs traffic.

60. The computer-readable media of claim 38, wherein at least one of the network sensors operates in the line of traffic.

61. The computer-readable media of claim 38, further comprising:
receiving an irregular event from one of the network sensors that identified an additional application event as a potential attack based on comparison to only the parts of the NBP determined to be stable.

62. The computer-readable media of claim 38, wherein the exiting the learn mode and entering the protect mode includes changing a current state of only the profile items determined to be stable to a protect state.

63. The computer-readable media of claim 38, wherein the exiting the learn mode and entering the protect mode includes distributing at least the profile items determined to be stable to at least one of the network sensors and protecting the applications using only the stable items of the NBP.

64. The computer-readable media of claim 38, wherein the exiting occurs on a per profile item basis and includes automatically distributing to the network sensors the stable profile items when they are determined to be stable.

65. The computer-readable media of claim 38, wherein the profile items include a URL item and a parameter item, and wherein the profile properties corresponding to the parameter item include a length restriction on a parameter's value and a parameter type for the parameter.

66. The computer-readable media of claim 65, wherein at least one of the applications is a web application, and the URL item describes a single URL within that web application.

67. The computer-readable media of claim 66, wherein the parameter item describes a list of parameters of HTTP requests submitted to a web server.

68. The computer-readable media of claim 65, wherein the profile items also comprise at least a web application item, a virtual folder item, and a cookie item, wherein the web application item describes a single web application in the web server group, wherein the virtual folder item defines a virtual folder within the web application, and the cookie item comprises cookies for the web application.

69. The computer-readable media of claim 38, wherein the profile items include one or more of a table access item and a query item, wherein the table access item has profile properties that define the enforcement mode for each type of query, and wherein a query item defines an SQL query and has a profile property that holds the SQL query.

70. The computer-readable media of claim 69, wherein the table access item defines the access profile of database clients to a database table.

71. The computer-readable media of claim 69, wherein the types of queries include select, update, delete, and insert.

72. The computer-readable media of claim 69, wherein the query item's distinguished name is the normalized text of the query.

73. The computer-readable media of claim 69, wherein the profile items also comprise a source group item that defines a homogeneous group of database clients having access to database servers.

74. The computer-readable media of claim 38, wherein:
the analysis of the application events includes:
a syntax analysis to generate functional units; and
a classification of the functional units as identification units and property units, wherein the identification units are used for identifying the application events, and wherein the property units describe the property of the application events; and
the generating the NBP comprises:
gathering the property units having at least one similar identification unit to form the profile property; and
attaching the profile property to its corresponding profile item.

75. A method performed by network sensors and a secure server for protection of an application of a secured system, wherein the application resides on a server, wherein the method comprises:
entering a learn mode of the secured system;
collecting application events gathered and reconstructed by the network sensors of the secured system analyzing network level protocol attributes;
analyzing the application events;
generating a normal behavior profile (NBP) based on the analysis of the application events, wherein the NBP comprises at least a plurality of profile items and each of the plurality profile items comprises a profile property;
performing in the secure server analysis on the NBP, wherein the analysis comprises:
computing a percentage of learning progress for each profile item out of the total number of the application events received over a predefined time; and
determining the respective profile item is stable if the percentage of learning progress exceeds a predefined threshold; and
exiting the learn mode and entering a protect mode for the secured system for at least the profile items determined to be stable.

76. The method of claim 75, wherein the method further comprises distributing at least the stable profile items of the NBP to the network sensors.

77. The method of claim 75, wherein the server is a web server.

78. The method of claim 75, wherein each of the network sensors is a hypertext transfer protocol (HTTP) sensor.

79. The method of claim 75, wherein the NBP is a hierarchic data structure.

80. The method of claim 79, wherein each of the profile properties comprises a descriptive value of its corresponding profile item.

81. The method of claim 75, wherein one of the profile properties for each of the profile items comprises at least a current state of the profile property, wherein the current state is one of a learn state and an enforceable state.

82. The method of claim 75, wherein one of the profile properties for each of the profile items comprises at least a current state of the profile property, wherein possible states for the current state include a learn state, an enforceable state, and a non-enforceable state.

83. The method of claim 75, wherein the profile item comprises at least one of a current state of the profile item and a distinguishable name.

84. The method of claim 83, wherein the current state is at least one of a learn state, a protect state, a deleted state, a decayed state and a merged state.

85. The method of claim 75, wherein the NBP represents a HTTP profile.

86. The method of claim 75, wherein analyzing the application events further comprises performing a syntax analysis.

87. The method of claim 86, wherein performing the syntax analysis comprises:
breaking each of the application events into functional units; and
classifying the functional units as identification units and property units.

88. The method of claim 87, wherein the identification units are used for identifying the application events.

89. The method of claim 87, wherein the property units describe the properties of the application events.

90. The method of claim 87, wherein generating the NBP further comprises:
gathering the property units having at least one similar identification unit to form the profile property; and
attaching the profile property to its corresponding profile item.

91. The method of claim 75, wherein the NBP is an adaptive NBP that is automatically updated while the system is operating in the protect mode.

92. The method of claim 75, wherein the application requests include HTTP requests.

93. The method of claim 75, wherein the network sensors are placed on each network segment that is coupled to the server the application resides on.

94. The method of claim 75, wherein at least one of the network sensors sniffs traffic.

95. The method of claim 75, wherein at least one of the network sensors operates in the line of traffic.

96. The method of claim 75, further comprising:
collecting, by one of the network sensors, an additional application event;
identifying the additional application event as a potential attack based on comparison to only the parts of the NBP determined to be stable.

97. The method of claim 75, wherein the exiting the learn mode and entering the protect mode includes changing a current state of only the profile items determined to be stable to a protect state.

98. The method of claim 75, wherein the exiting the learn mode and entering the protect mode includes distributing at least the profile items determined to be stable to at least one of the network sensors and protecting the application using only the stable items of the NBP.

99. The method of claim 75, wherein the exiting occurs on a per profile item basis and includes automatically distributing to the network sensors the stable profile items when they are determined to be stable.

100. The method of claim 75, wherein the profile items include a URL item and a parameter item, and wherein the profile properties corresponding to the parameter item include a length restriction on a parameter's value and a parameter type for the parameter.

101. The method of claim 100, wherein the application is a web application, and the URL item describes a single URL within that web application.

102. The method of claim 101, wherein the parameter item describes a list of parameters of HTTP requests submitted to a web server.

103. The method of claim 100, wherein the profile items also comprise at least a web application item, a virtual folder item, and a cookie item, wherein the web application item describes a single web application in the web server group, wherein the virtual folder item defines a virtual folder within the web application, and the cookie item comprises cookies for the web application.

104. The method of claim 75, wherein:
the analyzing the application events comprises:
performing syntax analysis to generate functional units; and
classifying the functional units as identification units and property units, wherein the identification units are used for identifying the application events, and wherein the property units describe the property of the application events; and
the generating the NBP comprises:
gathering the property units having at least one similar identification unit to form the profile property; and
attaching the profile property to its corresponding profile item.

105. A non-transitory, tangible computer-readable media which has stored in it instructions, which when executed by a secure server of a secured system for protection of an application, cause the secure server to perform the steps of:
entering a learn mode;
generating a normal behavior profile (NBP) based on an analysis of application events gathered and reconstructed by network sensors of the secured system analyzing network level protocol attributes, wherein the NBP comprises at least a plurality of profile items and each of the plurality profile items comprises a profile property;
performing analysis on the NBP, wherein the analysis comprises:
computing a percentage of learning progress for each profile item out of the total number of the application events received over a predefined time; and
determining the respective profile item is stable if the percentage of learning progress exceeds a predefined threshold; and
exiting the learn mode and entering a protect mode for at least the profile items determined to be stable.

106. The computer-readable media of claim 105, wherein the instructions further cause the secure server to perform the step of distributing at least the stable profile items of the NBP to the network sensors.

107. The computer-readable media of claim 105, wherein the application is on a web server.

108. The computer-readable media of claim 105, wherein each of the network sensors is a hypertext transfer protocol (HTTP) sensor.

109. The computer-readable media of claim 105, wherein the NBP is a hierarchic data structure.

110. The computer-readable media of claim 109, wherein each of the profile properties comprises a descriptive value of its corresponding profile item.

111. The computer-readable media of claim 105, wherein one of the profile properties for each of the profile items comprises at least a current state of the profile property, wherein the current state is one of a learn state and an enforceable state.

112. The computer-readable media of claim 105, wherein one of the profile properties for each of the profile items comprises at least a current state of the profile property, wherein possible states for the current state include a learn state, an enforceable state, and a non-enforceable state.

113. The computer-readable media of claim 105, wherein the profile item comprises at least one of a current state of the profile item and a distinguishable name.

114. The computer-readable media of claim 113, wherein the current state is at least one of a learn state, a protect state, a deleted state, a decayed state and a merged state.

115. The computer-readable media of claim 105, wherein the NBP represents a HTTP profile.

116. The computer-readable media of claim 105, wherein the analysis of the application events includes a syntax analysis.

117. The computer-readable media of claim 116, wherein the syntax analysis comprises:
breaking each of the application events into functional units; and
classifying the functional units as identification units and property units.

118. The computer-readable media of claim 117, wherein the identification units are used for identifying the application events.

119. The computer-readable media of claim 117, wherein the property units describe the properties of the application events.

120. The computer-readable media of claim 117, wherein generating the NBP further comprises:

gathering the property units having at least one similar identification unit to form the profile property; and attaching the profile property to its corresponding profile item.

121. The computer-readable media of claim 105, wherein the NBP is an adaptive NBP that is automatically updated while the system is operating in the protect mode.

122. The computer-readable media of claim 105, wherein the application requests include HTTP requests.

123. The computer-readable media of claim 105, wherein the network sensors are placed on each network segment that is coupled to the server the application resides on.

124. The computer-readable media of claim 105, wherein at least one of the network sensors sniffs traffic.

125. The computer-readable media of claim 105, wherein at least one of the network sensors operates in the line of traffic.

126. The computer-readable media of claim 105, further comprising:

receiving an irregular event from one of the network sensors that identified an additional application event as a potential attack based on comparison to only the parts of the NBP determined to be stable.

127. The computer-readable media of claim 105, wherein the exiting the learn mode and entering the protect mode includes changing a current state of only the profile items determined to be stable to a protect state.

128. The computer-readable media of claim 105, wherein the exiting the learn mode and entering the protect mode includes distributing at least the profile items determined to be stable to at least one of the network sensors and protecting the application using only the stable items of the NBP.

129. The computer-readable media of claim 105, wherein the exiting occurs on a per profile item basis and includes automatically distributing to the network sensors the stable profile items when they are determined to be stable.

130. The computer-readable media of claim 105, wherein the profile items include a URL item and a parameter item, and wherein the profile properties corresponding to the parameter item include a length restriction on a parameter's value and a parameter type for the parameter.

131. The computer-readable media of claim 130, wherein the application is a web application, and the URL item describes a single URL within that web application.

132. The computer-readable media of claim 131, wherein the parameter item describes a list of parameters of HTTP requests submitted to a web server.

133. The computer-readable media of claim 130, wherein the profile items also comprise at least a web application item, a virtual folder item, and a cookie item, wherein the web application item describes a single web application in the web server group, wherein the virtual folder item defines a virtual folder within the web application, and the cookie item comprises cookies for the web application.

134. The computer-readable media of claim 105, wherein:

the analysis of the application events includes:

a syntax analysis to generate functional units; and a classification of the functional units as identification units and property units, wherein the identification units are used for identifying the application events, and wherein the property units describe the property of the application events; and the generating the NBP comprises:

gathering the property units having at least one similar identification unit to form the profile property; and attaching the profile property to its corresponding profile item.

135. A network security system that utilizes a dynamic learning process for protection of applications, wherein the security system comprises:

a plurality of network sensors, placed on each network segment that is coupled to servers the applications reside on, configured to collect application events by one or more of analyzing network level protocol attributes and polling one or more of the applications for information about recent application events, during a learn mode;

a computer coupled to the plurality of network sensors, the computer configured to generate normal behavior profiles (NBPs) during the learn mode of the security system, wherein the computer further configured to perform an analysis to determine, for each of the NBPs, if the NBP is stable, wherein the analysis comprises:

a computation of a percentage of learning progress for each profile item in the NBP out of the total number of the application events received over a predefined time; and a determination that the respective profile item is stable if the percentage of learning progress exceeds a predefined threshold.

136. The security system of claim 135, wherein said computer is also to distribute at least the stable profile items of the NBPs to the network sensors, and wherein the network sensors are also to determine whether additional application events are potential attacks based on comparison of the additional application events to the parts of the NBP determined to be stable.

137. The security system of claim 135, wherein each of the applications is at least one of a web application and a database.

138. The security system of claim 135, wherein each of the network sensors is at least one of a structured query language (SQL) sensor and a hypertext transfer protocol (HTTP) sensor.

139. The security system of claim 135, wherein at least one of the NBPs is a hierarchic data structure.

140. The security system of claim 135, wherein at least one of the NBPs comprises a plurality of profile items and each of the plurality of the profile items comprises a profile property.

141. The security system of claim 135, wherein the dynamic learning process comprises an analysis of the application events.

142. The security system of claim 135, wherein a given one of the NBPs is considered stable if at least one of its plurality of profile items is stable.

143. The security system of claim 135, wherein the secure sever is also configured to distribute at least one of the stable NBPs to those of the network sensors placed on those of the network segments coupled to at least one of the servers on which at least one of the applications resides.

144. The security system of claim 135, wherein at least one of the NBPs represents at least one of a HTTP profile and a SQL profile.

145. The security system of claim 135, wherein at least one of the NBPs is an adaptive NBP that is automatically updatable while the system is operating in the PROTECT mode.

146. The security system of claim 135, wherein at least one of the network sensors sniffs traffic.

147. The security system of claim 135, wherein at least one of the network sensors operates in the line of traffic.

148. The security system of claim 135, wherein the computer is also configured to distribute at least the profile items determined to be stable to at least one of the network sensors and to cause that network sensor to enter a protect mode using only the stable profile items.

149. The security system of claim 135, wherein the computer is also configured to automatically distribute to the appropriate network sensors the stable profile items when they are determined to be stable.

150. The security system of claim 135, wherein the profile items include a URL item and a parameter item, and wherein the profile properties corresponding to the parameter item include a length restriction on a parameter's value and a parameter type for the parameter.

151. The security system of claim 150, wherein at least one of the applications is a web application, and the URL item describes a single URL within that web application.

152. The security system of claim 151, wherein the parameter item describes a list of parameters of HTTP requests submitted to a web server.

153. The security system of claim 150, wherein the profile items also comprise at least a web application item, a virtual folder item, and a cookie item, wherein the web application item describes a single web application in the web server group, wherein the virtual folder item defines a virtual folder within the web application, and the cookie item comprises cookies for the web application.

154. The security system of claim 135, wherein the profile items include one or more of a table access item and a query item, wherein the table access item has profile properties that define the enforcement mode for each type of query, and wherein a query item defines an SQL query and has a profile property that holds the SQL query.

155. The security system of claim 154, wherein the table access item defines the access profile of database clients to a database table.

156. The security system of claim 154, wherein the types of queries include select, update, delete, and insert.

157. The security system of claim 154, wherein the query item's distinguished name is the normalized text of the query.

158. The security system of claim 154, wherein the profile items also comprise a source group item that defines a homogeneous group of database clients having access to database servers.

159. A network security system that utilizes a dynamic learning process for protection of an application, wherein the security system comprises:
  a plurality of network sensors, placed on each network segment that is coupled to a server the application resides on, configured to collect application events by analyzing network level protocol attributes, during a learn mode;
  a computer coupled to the plurality of network sensors, the computer configured to generate a normal behavior profile (NBP) during the learn mode of the security system, wherein the computer is further configured to perform an analysis to determine, for each of the NBPs, if the NBP is stable, wherein the analysis comprises:
    a computation of a percentage of learning progress for each profile item in the NBP out of the total number of the application events received over a predefined time; and
    a determination that the respective profile item is stable if the percentage of learning progress exceeds a predefined threshold.

160. The security system of claim 159, wherein said computer is also to distribute at least the stable profile items of the NBP to the network sensors, and wherein the network sensors are also to determine whether additional application events are potential attacks based on comparison of the additional application events to the parts of the NBP determined to be stable.

161. The security system of claim 159, wherein the application is a web application.

162. The security system of claim 159, wherein each of the network sensors is a hypertext transfer protocol (HTTP) sensor.

163. The security system of claim 159, wherein the NBP is a hierarchic data structure.

164. The security system of claim 159, wherein the NBP comprises a plurality of profile items and each of the plurality of the profile items comprises a profile property.

165. The security system of claim 159, wherein the dynamic learning process comprises an analysis of the application events.

166. The security system of claim 159, wherein the NBP is considered stable if at least one of its plurality of profile items is stable.

167. The security system of claim 159, wherein the NBP represents a HTTP profile.

168. The security system of claim 159, wherein the NBP is an adaptive NBP that is automatically updatable while the system is operating in the protect mode.

169. The security system of claim 159, wherein at least one of the network sensors sniffs traffic.

170. The security system of claim 159, wherein at least one of the network sensors operates in the line of traffic.

171. The security system of claim 159, wherein the computer is also configured to distribute at least the profile items determined to be stable to the network sensors and to cause that network sensors to enter a protect mode using only the stable profile items.

172. The security system of claim 159, wherein the computer is also configured to automatically distribute to the network sensors the stable profile items when they are determined to be stable.

173. The security system of claim 159, wherein the profile items include a URL item and a parameter item, and wherein the profile properties corresponding to the parameter item include a length restriction on a parameter's value and a parameter type for the parameter.

174. The security system of claim 173, wherein the application is a web application, and the URL item describes a single URL within that web application.

175. The security system of claim 174, wherein the parameter item describes a list of parameters of HTTP requests submitted to a web server.

176. The security system of claim 173, wherein the profile items also comprise at least a web application item, a virtual folder item, and a cookie item, wherein the web application item describes a single web application in the web server group, wherein the virtual folder item defines a virtual folder within the web application, and the cookie item comprises cookies for the web application.

177. A method, performed by a sensor and a secure server, for protecting an application installed on a server, the method comprising:
  collecting in the sensor from an application layer protocol application requests sent by clients to the application installed on the server;
  automatically building, based on the collected application requests, a normal behavior profile (NBP), wherein the NBP characterizes the application;
  automatically performing analysis to determine that at least part of the NBP is stable, wherein the performing comprises:
    computing a percentage of learning progress for different parts of the NBP; and determining the respective part is stable if the percentage of learning progress exceeds a predefined threshold;

deploying by the secure server at least the stable part of the NBP to the sensor;

collecting an additional application request in the sensor; and identifying the additional application request as a potential attack based on comparison to the stable part of the NBP.

178. The method of claim 177, wherein the deploying is automatic responsive to the determination of stability.

179. The method of claim 177, wherein the performing analysis comprises computing a Bayesian probability for a mistake.

180. The method of claim 177, wherein:

the NBP comprises at least a plurality of profile items and a plurality of profile properties, wherein each of the plurality of profile items comprises at least one profile property, wherein the profile items and the profile properties characterize the application;

the computing includes computing the percentage of learning progress for each profile item and profile property out of the total number of the application requests received over a predefined time; and the determining includes determining the respective profile item or the profile property as stable if the percentage of learning progress exceeds a predefined threshold.

181. The method of claim 177, further comprising:

polling, by a second sensor, information about recent application collecting in a second sensor from an application layer protocol application requests sent by clients to the application installed on the server;

automatically building, based on the collected application requests, a normal behavior profile (NBP), wherein the NBP characterizes the application.

182. The method of claim 177, wherein the application requests are HTTP requests and the collecting includes gathering and reconstructing the HTTP requests.

183. The method of claim 177, the collecting, automatically building, performing, deploying, and identifying are performed without any prior knowledge of the application semantics.

184. The method of claim 177, wherein the server is a web server.

185. The method of claim 177, wherein the NBP is a hierarchic data structure.

186. The method of claim 177, wherein the NBP represents a HTTP profile.

187. The method of claim 177, wherein the NBP is an adaptive NBP that is automatically updated while the system is operating in a protect mode.

188. The method of claim 177, wherein the network sensor sniffs traffic.

189. The method of claim 177, wherein the sensors operates in the line of traffic.

190. The method of claim 177, wherein the performing includes changing a current state of only profile items of the NBP determined to be stable to a protect state.

191. The method of claim 190, wherein the deploying includes distributing at least the profile items determined to be stable to the sensor.

192. The method of claim 177, wherein the performing occurs on a per profile item basis within the NBP, and the deploying includes distributing to the sensor the stable profile items when they are determined to be stable.

193. The method of claim 192, wherein the profile items include a URL item and a parameter item, and wherein profile properties corresponding to the parameter item include a length restriction on a parameter's value and a parameter type for the parameter.

194. A non-transitory, tangible computer-readable media which has stored in it instructions, which when executed by a computer of a secured system for protection of applications, cause the computer to perform the steps of:

receiving application events processed by sensors coupled between clients and servers on which the applications reside;

analyzing the application events;

generating a normal behavior profile (NBP) based on results of the step of analyzing the application events, the NBP comprises at least a plurality of profile items and each of the plurality profile items comprises a profile property;

automatically performing analysis to determine if any of the profile items of the NBP are stable, wherein a given one of said profile items is considered stable when it is ready to detect anomalous application events, and wherein the performing comprises:

computing a percentage of learning progress for the profile items of the NBP; and determining the respective profile item is stable if the percentage of learning progress exceeds a predefined threshold;

deploying the stable profile items of the NBP to the sensors to use for detecting anomalous application events.

195. The non-transitory, tangible computer-readable media of claim 194, wherein the deploying is automatic responsive to the determination of stability.

196. The non-transitory, tangible computer-readable media of claim 194, wherein the receiving, analyzing, generating, performing, and deploying are performed without any prior knowledge of the applications semantics.

197. The non-transitory, tangible computer-readable media of claim 194, wherein each of the sensors is at least one of a structured query language (SQL) sensor and a hypertext transfer protocol (HTTP) sensor.

198. The non-transitory, tangible computer-readable media of claim 194, wherein the NBP is a hierarchic data structure.

199. The non-transitory, tangible computer-readable media of claim 194, wherein the NBP represents at least one of a HTTP profile and a SQL profile.

200. The non-transitory, tangible computer-readable media of claim 194, wherein analyzing the application events further comprises: performing a lexical analysis;

and performing a syntax analysis.

201. The non-transitory, tangible computer-readable media of claim 200, wherein performing the lexical analysis comprises:

breaking each of the plurality of application events into tokens; and creating a representation of the application event using the tokens' properties.

202. The non-transitory, tangible computer-readable media of claim 200, wherein performing the syntax analysis comprises:

breaking each of the application events into functional units; and classifying the functional units as identification units and property units.

203. The non-transitory, tangible computer-readable media of claim 202, wherein the identification units are used for identifying the application events.

204. The non-transitory, tangible computer-readable media of claim 202, wherein the property units describe the properties of the application events.

205. The non-transitory, tangible computer-readable media of claim 202, wherein generating the NBP further comprises:
gathering the property units having at least one similar identification unit to form the profile property; and
attaching the profile property to its corresponding profile item.

206. The non-transitory, tangible computer-readable media of claim 194, wherein the performing analysis comprises computing a Bayesian probability for a mistake.

207. The non-transitory, tangible computer-readable media of claim 194, wherein:
the NBP also comprises a plurality of profile properties, wherein each of the plurality of profile items comprises at least one profile property, wherein the profile items and the profile properties characterize the application
the computing includes computing the percentage of learning progress for each profile item and profile property out of the total number of the application requests received over a predefined time; and
the determining includes determining the respective profile item or the profile property as stable if the percentage of learning progress exceeds a predefined threshold.

208. The non-transitory, tangible computer-readable media of claim 194, wherein the NBP is an adaptive NBP that is automatically updated while the system is operating in a protect mode.

209. The non-transitory, tangible computer-readable media of claim 194, wherein the application events are based on HTTP requests.

210. The non-transitory, tangible computer-readable media of claim 194, wherein at least one of the sensors sniffs traffic.

211. The non-transitory, tangible computer-readable media of claim 194, wherein at least one of the sensors operates in the line of traffic.

212. The non-transitory, tangible computer-readable media of claim 194, wherein the profile items include a URL item and a parameter item, and wherein profile properties corresponding to the parameter item include a length restriction on a parameter's value and a parameter type for the parameter.

213. The non-transitory, tangible computer-readable media of claim 212, wherein at least one of the applications is a web application, and the URL item describes a single URL within that web application.

214. The non-transitory, tangible computer-readable media of claim 213, wherein the parameter item describes a list of parameters of HTTP requests submitted to a web server.

215. The non-transitory, tangible computer-readable media of claim 194, wherein the profile items include one or more of a table access item and a query item, wherein the table access item has profile properties that define the enforcement mode for each type of query, and wherein a query item defines an SQL query and has a profile property that holds the SQL query.

216. The non-transitory, tangible computer-readable media of claim 215, wherein the table access item defines the access profile of database clients to a database table.

217. The non-transitory, tangible computer-readable media of claim 215, wherein the types of queries include select, update, delete, and insert.

218. The non-transitory, tangible computer-readable media of claim 215, wherein the query item's distinguished name is the normalized text of the query.

219. The non-transitory, tangible computer-readable media of claim 215, wherein the profile items also comprise a source group item that defines a homogeneous group of database clients having access to database servers.

220. The non-transitory, tangible computer-readable media of claim 194, wherein:
the analyzing the application events comprises:
performing syntax analysis to generate functional units; and
classifying the functional units as identification units and property units, wherein the identification units are used for identifying the application events, and wherein the property units describe the property of the application events; and
the generating the NBP comprises:
gathering the property units having at least one similar identification unit to form the profile property; and
attaching the profile property to its corresponding profile item.

221. A network security system that utilizes a dynamic learning process for protection of applications, wherein the security system comprises:
a plurality of network sensors, coupled between clients and servers on which the applications reside, configured to collect application events; and
a computer, coupled to the plurality of network sensors, configured to automatically generate a normal behavior profiles (NBP) based on the collected application events, to automatically perform analysis to determine if at least part of that NBP is stable, and to deploy at least the stable parts of the NBP to the network sensors to use for detecting anomalous application events, wherein the analysis comprises:
a computation of a percentage of learning progress for different parts of the NBP; and
a determination that the respective part is stable if the percentage of learning progress exceeds a predefined threshold.

222. The security system of claim 221, wherein each of the applications is at least one of a web application and a database.

223. The security system of claim 221, wherein each of the network sensors is at least one of a structured query language (SQL) sensor and a hypertext transfer protocol (HTTP) sensor.

224. The security system of claim 221, wherein the NBP is a hierarchic data structure.

225. The security system of claim 221, wherein the NBP comprises a plurality of profile items and each of the plurality of the profile items comprises a profile property.

226. The security system of claim 225, wherein the NBP is considered stable if at least one of its plurality of profile items is stable.

227. The security system of claim 221, wherein the dynamic learning process comprises an analysis of the application events.

228. The security system of claim 221, wherein the NBP represents at least one of a HTTP profile and a SQL profile.

229. The security system of claim 221, wherein the NBP is an adaptive NBP that is automatically updatable while the system is operating in a PROTECT mode.

230. The security system of claim 221, wherein at least one of the network sensors sniffs traffic.

231. The security system of claim 221, wherein at least one of the network sensors operates in the line of traffic.

232. The security system of claim 221, wherein the deployment includes distribution of at least profile items of the NBP determined to be stable to at least one of the network sensors and entry of that network sensor into a protect mode using only the stable profile items.

233. The security system of claim 221, wherein the computer is also configured to automatically perform the deployment of profile items of the NBP when they are determined to be stable.

234. The security system of claim 233, wherein the profile items include a URL item and a parameter item, and wherein profile properties corresponding to the parameter item include a length restriction on a parameter's value and a parameter type for the parameter.

235. The security system of claim 234, wherein at least one of the applications is a web application, and the URL item describes a single URL within that web application.

236. The security system of claim 235, wherein the parameter item describes a list of parameters of HTTP requests submitted to a web server.

237. The security system of claim 233, wherein the profile items include one or more of a table access item and a query item, wherein the table access item has profile properties that define the enforcement mode for each type of query, and wherein a query item defines an SQL query and has a profile property that holds the SQL query.

238. The security system of claim 237, wherein the table access item defines the access profile of database clients to a database table.

239. The security system of claim 238, wherein the types of queries include select, update, delete, and insert.

240. The security system of claim 237, wherein the query item's distinguished name is the normalized text of the query.

241. The security system of claim 237, wherein the profile items also comprise a source group item that defines a homogeneous group of database clients having access to database servers.

242. An application level security system to protect a web server and a database server comprising:
a first network sensor, coupled between a client and the web server, to collect HTTP requests sent by the client to the web server;
a second network sensor, coupled between the web server and the database server, to collect any SQL requests sent to the database server as a consequence of the HTTP requests;
a computer coupled to the first network sensor and the second network sensor, to execute a profiling process to automatically generate a first and second normal behavior profile (NBP) respectively for the web server and the database server based respectively on the collected HTTP requests and the collected SQL requests, to automatically perform analysis to determine whether the first and second NBP comprise at least one stable profile item useable to detect anomalies, and to upload copies of the NBPs with at least one stable profile item, wherein the first NBP characterizes the web server and a copy is uploaded to the first network sensor, wherein the second NBP characterizes the database server and a copy is uploaded to the second network sensor, wherein the analysis comprises:
a computation of a percentage of learning progress for each profile item in the NBP; and
a determination that the respective profile item is stable if the percentage of learning progress exceeds a predefined threshold.

243. The security system of claim 242, wherein the first network sensor, upon receiving the uploaded copy of the first NBP, is also to compare the HTTP requests to the stable profile items of the uploaded copy of the first NBP and to report to the computer those of the HTTP requests that deviate from the stable profile items of the NBP.

244. The security system of claim 242, wherein the uploaded copy of the first NBP held by the first network sensor includes only a subset of the information existing in the first NBP held by the computer.

245. The security system of claim 242, wherein the second network sensor, upon receiving the uploaded copy of the second NBP, is also to compare the SQL requests to the stable profile items of the uploaded copy of the second NBP and to report to the computer those of the SQL requests that deviate from the stable profile items of the NBP.

246. The security system of claim 242, wherein the uploaded copy of the second NBP held by the second network sensor includes only a subset of the information existing in the second NBP held by the computer.

247. The security system of claim 242, wherein the profiling process is a dynamic learning process.

248. The security system of claim 242, wherein a decision is made during the profiling process as to whether to use an application event for protection or learning based on a single profile item in the NBP, wherein the NBP comprises a plurality of profile items, wherein each item comprises at least one profile property.

249. The security system of claim 242, wherein the NBPs are hierarchic data structures.

250. The security system of claim 242, wherein the NBPs comprise a plurality of profile items and each of the plurality of the profile items comprises a profile property.

251. The security system of claim 242, wherein the NBPs are adaptive NBPs that is automatically updatable while the system is operating in a PROTECT mode.

252. The security system of claim 242, wherein at least one of the network sensors sniffs traffic.

253. The security system of claim 242, wherein at least one of the network sensors operates in the line of traffic.

254. The security system of claim 242, wherein the computer is also configured to perform the upload of a given one of the NBPs when one of the profile items is determined to be stable.

255. The security system of claim 242, wherein the profile items of the first NBP include a URL item and a parameter item, and wherein profile properties corresponding to the parameter item include a length restriction on a parameter's value and a parameter type for the parameter.

256. The security system of claim 255, wherein the URL item describes a single URL within the web server.

257. The security system of claim 256, wherein the parameter item describes a list of parameters of HTTP requests submitted to the web server.

258. The security system of claim 242, wherein the profile items of the second NBP include one or more of a table access item and a query item, wherein the table access item has profile properties that define the enforcement mode for each type of query, and wherein a query item defines an SQL query and has a profile property that holds the SQL query.

259. The security system of claim 258, wherein the table access item defines the access profile of database clients to a database table.

260. The security system of claim 259, wherein the types of queries include select, update, delete, and insert.

261. The security system of claim 258, wherein the query item's distinguished name is the normalized text of the query.

262. The security system of claim 258, wherein the profile items also comprise a source group item that defines a homogeneous group of database clients having access to database servers.

263. A network security system that utilizes a dynamic learning process for protection of a web application on a web server, wherein the security system comprises:
  a computer configured to automatically generate a normal behavior profiles (NBP) based on application events collected by a sensor coupled to receive HTTP requests sent from clients to the web application, to automatically perform analysis to determine when different profile items within the NBP become stable such that they are usable to detect anomalies, and to automatically deploy the stable profile items of the NBP to the sensor to use for detecting anomalous HTTP requests, wherein the analysis comprises:
    a computation of a percentage of learning progress for each profile item in the NBP; and
    a determination that the respective profile item is stable if the percentage of learning progress exceeds a predefined threshold.

264. The security system of claim 263, wherein the NBP is a hierarchic data structure.

265. The security system of claim 263, wherein each of the profile items comprises a profile property.

266. The security system of claim 263, wherein the dynamic learning process comprises an analysis of the application events.

267. The security system of claim 263, wherein the NBP is an adaptive NBP that is automatically updatable while the system is operating in a PROTECT mode.

268. The security system of claim 263, wherein the sensor sniffs traffic.

269. The security system of claim 263, wherein the sensor operates in the line of traffic.

270. The security system of claim 263, wherein the profile items include a URL item and a parameter item, and wherein profile properties corresponding to the parameter item include a length restriction on a parameter's value and a parameter type for the parameter.

271. The security system of claim 270, wherein the URL item describes a single URL within the web application.

272. The security system of claim 270, wherein the parameter item describes a list of parameters of the HTTP requests submitted to the web application.

\* \* \* \* \*